(12) United States Patent
Chen

(10) Patent No.: US 12,481,640 B2
(45) Date of Patent: Nov. 25, 2025

(54) DATA TYPE CONVERSION METHOD, STORAGE MEDIUM, DEVICE, AND PRINTED CIRCUIT BOARD

(71) Applicant: Cambricon (Xi'an) Semiconductor Co., Ltd., Xi'an (CN)

(72) Inventor: Weilun Chen, Xi'an (CN)

(73) Assignee: CAMBRICON (XI'AN) SEMICONDUCTOR CO., LTD., Xi'an (CN)

( * ) Notice: Subject to any disclaimer, the term of this patent is extended or adjusted under 35 U.S.C. 154(b) by 0 days.

(21) Appl. No.: 18/692,019

(22) PCT Filed: Jun. 20, 2022

(86) PCT No.: PCT/CN2022/099771
§ 371 (c)(1),
(2) Date: Mar. 14, 2024

(87) PCT Pub. No.: WO2023/040389
PCT Pub. Date: Mar. 23, 2023

(65) Prior Publication Data
US 2025/0130987 A1   Apr. 24, 2025

(30) Foreign Application Priority Data
Sep. 18, 2021  (CN) .......................... 202111101381.9

(51) Int. Cl.
*G06F 7/00* (2006.01)
*G06F 7/02* (2006.01)
(Continued)

(52) U.S. Cl.
CPC ............ *G06F 16/2365* (2019.01); *G06F 7/02* (2013.01)

(58) Field of Classification Search
None
See application file for complete search history.

(56) References Cited

U.S. PATENT DOCUMENTS

| 2020/0201602 | A1* | 6/2020 | Felix | G06F 5/012 |
| 2021/0208879 | A1* | 7/2021 | Song | G06F 7/5443 |
| 2023/0273768 | A1* | 8/2023 | Wu | G06F 7/4876 |
| | | | | 708/205 |

FOREIGN PATENT DOCUMENTS

| CN | 111340207 A | 6/2020 |
| CN | 113791756 A | 12/2021 |
| WO | 2023040389 A1 | 3/2023 |

OTHER PUBLICATIONS

CN202111101381.9—Second office action mailed on Aug. 11, 2022, 17 pages.
(Continued)

*Primary Examiner* — Tuan A Pham
(74) *Attorney, Agent, or Firm* — Getech Law LLC; Jun Ye

(57) ABSTRACT

The present disclosure relates to a method for converting a data type, a computer readable storage medium, an apparatus, and a board card. The computing apparatus of the present disclosure is included in an integrated circuit apparatus. The integrated circuit apparatus includes a general interconnection interface and other processing apparatus. The computing apparatus interacts with other processing apparatus to jointly complete a computing operation specified by a user. The integrated circuit apparatus further includes a storage apparatus. The storage apparatus is connected to the computing apparatus and other processing apparatus, respectively. The storage apparatus is used for data storage of the computing apparatus and other processing apparatus.

12 Claims, 10 Drawing Sheets

(51) Int. Cl.
*G06F 16/00* (2019.01)
*G06F 16/23* (2019.01)

(56) References Cited

OTHER PUBLICATIONS

PCT/CN2022/099771—International Search Report and Written Opinion mailed on Sep. 1, 2022, 10 pages.

\* cited by examiner

DATA TYPE CONVERSION METHOD, STORAGE MEDIUM, DEVICE, AND PRINTED CIRCUIT BOARD

CROSS REFERENCE OF RELATED APPLICATION

The present application claims priority to 371 of International Application No. PCT/CN2022/099771, filed Jun. 20, 2022, which claims priority to Chinese Patent Application No. 202111101381.9 with the title of "Data Type Conversion Method, Storage Medium, Apparatus, and Board Card" and filed on Sep. 18, 2021.

TECHNICAL FIELD

The present disclosure generally relates to a computer field. More specifically, the present disclosure relates to a method for converting input data from a first data type to a second data type, a computer readable storage medium, an apparatus, and a board card.

BACKGROUND

Deep learning has become the mainstream of machine learning today due to its remarkable performance in many fields in recent years, but its huge amount of computation is still criticized. In order to balance computing power demand and precision, model compression has become one of the hot spots in the industry.

One model compression method is called quantization. Neural networks require a lot of data to participate in the operation, and in some cases, the precision of these pieces of data may not be too high. Quantization refers to the conversion of high-precision data types into low-precision data types when high-precision operations are not required, so as to save resource consumption during the operation, which is also known as a data type conversion. The core challenge of quantization is to reduce precision while maintaining the accuracy of the model; in other words, the core challenge of quantization is to strike a balance between compressibility and accuracy. In particular, data after the data type conversion will be continuously computed, stored and re-quantized in the model. Often, the more times the data is iterated, after repeated data type conversions, the less precise the data is, so that the computing power of the neural network model is not ideal.

Therefore, a data type conversion scheme that maintains precision during multiple iterations is urgently needed.

SUMMARY

To at least partially address the technical issues mentioned in the background, this disclosed scheme provides a method for converting input data from a first data type to a second data type, a computer readable storage medium, an apparatus, and a board card.

A first aspect of the present disclosure discloses a method for converting input data from a first data type to a second data type. The first data type includes a first exponent bit and a first mantissa bit, and the second data type includes a second exponent bit and a second mantissa bit. The method includes: judging whether the number of bits of the first exponent bit is the same as the number of bits of the second exponent bit; performing following steps if the number of bits of the first exponent bit is the same as the number of bits of the second exponent bit: determining comparison data for the number of bit difference between the first mantissa bit and the second mantissa bit in the first mantissa bit; generating random data, where the number of bits of the random data is the number of bit difference; judging whether the comparison data is greater than the random data; and carrying the second mantissa bit if the comparison data is greater than the random data.

A second aspect of the present disclosure discloses a computer readable storage medium, on which computer program codes for converting input data from a first data type to a second data type are stored. When the computer program codes are run by a processing apparatus, the aforementioned method is performed.

A third aspect of the present disclosure discloses a computing apparatus, which converts input data from a first data type to a second data type, where the first data type includes a first exponent bit and a first mantissa bit, and the second data type includes a second exponent bit and a second mantissa bit. The computing apparatus includes: a control unit, a storage unit, and an operation unit.

The control unit is configured to send a plurality of instructions. The storage unit is configured to temporarily store input data and random data and send the input data and the random data according to at least one of the plurality of instructions, where the number of bits of the random data is the number of bit difference. The operation unit, according to at least one of the plurality of instructions, is configured to: judge whether the number of bits of the first exponent bit is the same as the number of bits of the second exponent bit; determine comparison data for the number of bit difference between the first mantissa bit and the second mantissa bit in the first mantissa bit if the number of bits of the first exponent bit is the same as the number of bits of the second exponent bit; judge whether the comparison data is greater than the random data; and carry the second mantissa bit if the comparison data is greater than the random data.

A fourth aspect of the present disclosure discloses an integrated circuit apparatus, including the aforementioned computing apparatus. Moreover, the present disclosure also discloses a board card, including the aforementioned integrated circuit apparatus.

The present disclosure generates comparison data and compares the comparison data with randomly generated random data to determine whether the comparison data is required to be carried or directly rounded. Because the random data is different each time, the precision of the present disclosure may be maintained within an acceptable range during multiple iterations.

BRIEF DESCRIPTION OF DRAWINGS

By reading the following detailed description with reference to drawings, the above and other objects, features and technical effects of exemplary implementations of the present disclosure will become easier to understand. In the drawings, several implementations of the present disclosure are shown in an exemplary manner rather than a restrictive manner, and the same or corresponding reference numerals indicate the same or corresponding parts.

DETAILED DESCRIPTION

Technical solutions in embodiments of the present disclosure will be described clearly and completely hereinafter with reference to drawings in the embodiments of the present disclosure. Obviously, embodiments to be described are merely some rather than all embodiments of the present disclosure. All other embodiments obtained by those of ordinary skill in the art based on the embodiments of the present disclosure without creative efforts shall fall within the protection scope of the present disclosure.

It should be understood that terms such as "first", "second", "third", and "fourth" in the claims, the specification, and the drawings of the present disclosure are used for distinguishing different objects rather than describing a specific order. Terms such as "including" and "comprising" used in the specification and the claims of the present disclosure indicate the presence of a feature, an entity, a step, an operation, an element, and/or a component, but do not exclude the existence or addition of one or more other features, entities, steps, operations, elements, components, and/or collections thereof.

It should also be understood that terms used in the specification of the present disclosure are merely for a purpose of describing a particular embodiment rather than limiting the present disclosure. As being used in the specification and the claims of the present disclosure, unless the context clearly indicates otherwise, singular forms such as "a", "an", and "the" are intended to include plural forms. It should also be understood that a term "and/or" used in the specification and the claims of the present disclosure refers to any and all possible combinations of one or more of relevant listed items and includes these combinations.

As being used in the specification and the claims of the present disclosure, a term "if" may be interpreted as "when", or "once" or "in response to a determination" or "in response to a case where something is detected" depending on the context.

Specific implementations of the present disclosure will be described in detail in combination with drawings below.

Figure 1:
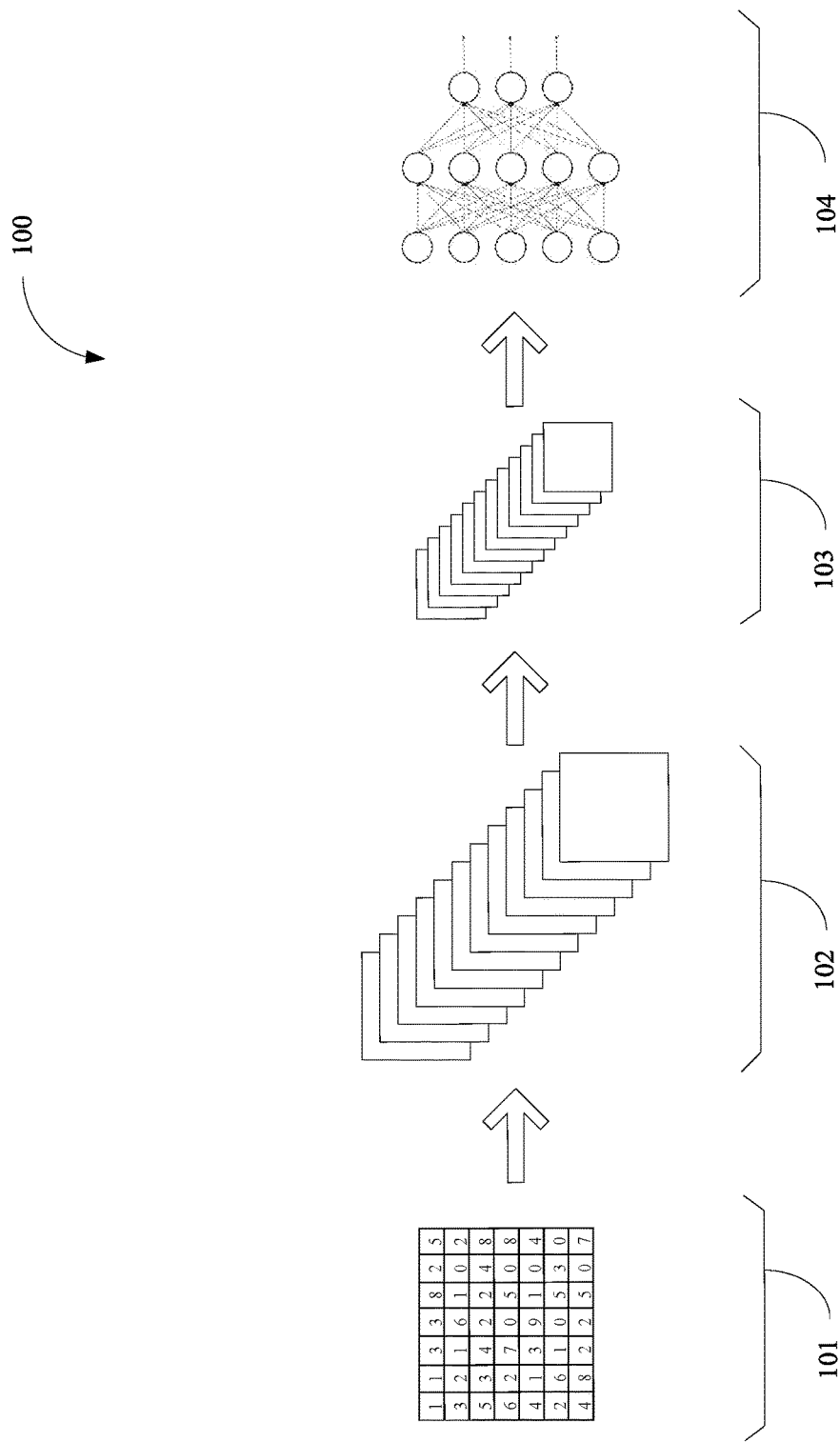
FIG. 1 is a four-layer structure diagram of a neural network.

A neural network is composed of a plurality of neuron systems connected according to certain rules. Taking a convolution neural network as an example, roughly, the neural network is composed of following four kinds of layers: an input layer, a convolution layer, a pooling layer, and a fully connected layer. FIG. 1 is a four-layer structure diagram of a neural network 100.

An input layer 101 is configured to truncate part of information from input data and convert the part of information into a feature matrix for presentation, where the feature matrix contains features corresponding to the part of information. Here, the input data includes, but is not limited to, image data, speech data, or text data, and also includes weight data.

A convolution layer 102 is configured to receive the feature matrix from the input layer 101 and perform feature extraction on the input data through a convolution operation. The convolution layer 102 may be constructed as multiple convolution layers in practice. Taking image data as an example, a first half of the convolution layers is configured to capture local and detailed information of an image. For example, each pixel of an output image only receives a computing result of a small value range of an input image. Receptive ranges of subsequent convolution layers are increased layer by layer to capture more complex and abstract information of the image. After operations of the multiple convolution layers, abstract representations of the image in different scales are obtained finally. Although the feature extraction of the input image is completed through the convolution operation, there are too much feature image information and the number of dimensions is too large, which not only takes too much time to compute, but also easily leads to overfitting, requiring further dimensionality reduction.

A pooling layer 103 is configured to replace a certain area of data with a value. This value is usually a maximum value or an average value among all values in the area. If the maximum value is used, it is called maximum pooling. If the average value is used, it is called mean pooling. By pooling, on the premise of not losing too much information, a size of a model may be reduced, and computing speed may be improved.

A fully connected layer 104 plays the role of a classifier in the whole convolution neural network 200. The fully connected layer 104 performs feature space conversions, where all useful information in previous layers is extracted and integrated. With nonlinear mapping of the aforementioned activation function, multiple fully connected layers may simulate any nonlinear conversion theoretically to perform information comparison based on different classifications to determine whether the input data is similar to the object of comparison.

Operations of the convolution layer 102 and the fully connected layer 104 take up most of hardware resources. In particular, the convolution layer 102 involves a large number of high-frequency off-chip and on-chip moving of neuron data and weight data and iterative operations. In order to reduce the burden of hardware, quantization or data type conversion is generally performed before moving or operations; in other words, high-precision data is converted to low-precision data.

When a floating-point number is represented by a computer-recognizable data type, according to the IEEE 754 floating-point number standard, a number is represented by a triplet, which includes a sign bit (sign), an exponent bit (exp), and a mantissa bit (man). The sign bit represents a sign of the number, where when a value of the sign bit is 0, the sign bit represents a positive number, and when the value of the sign bit is 1, the sign bit represents a negative number. Representations of a number may be divided into a non-number (NAN), an infinite number (INF), a normalized number (normal), and a denormalized number (denorm).

The non-number represents a non-numeric value, whose values of an exponent bit are all 1 and whose values of a mantissa bit are not all 0; the infinite number represents an infinite value, whose values of an exponent bit are all 1 and whose values of a mantissa bit are all 0, and then whether the infinite number is positive or negative infinity depends on a value of a sign bit; the normalized number is to omit a number 1 before a decimal point, where values of an exponent bit of the normalized number are not all 1 and not all 0; and the denormalized number is to omit a number 0 before a decimal point, where values of an exponent bit of the denormalized number are all 0.

FP32 is a kind of high-precision data type, and based on the IEEE 754 format specification, a data type of the FP32 includes a 1-bit sign bit, an 8-bit exponent bit, and a 23-bit mantissa bit, totaling 1+8+23=32 bits, where FP32[31] is the sign bit, FP32[30:23] is the exponent bit, and FP32[22:0] is the mantissa bit; in other words, a 0th bit FP32[0] in 32 bits holds a least significant bit (LSB) of the mantissa bit, a 22nd bit FP32[22] holds a most significant bit (MSB) of the mantissa bit, a 23rd bit FP32[23] holds an LSB of the exponent bit, a 30th bit FP32[30] holds an MSB of the exponent bit, and the highest bit FP32[31] of the whole sequence contains sign information. A normalized form of FP32 is:

$$value = (-1)^{sign} \times 1.man \times 2^{exp-127}.$$

For the normalized form, a value range (a range of orders of magnitude of a floating-point number) is between $[2^{-126}, 2^{128})$. However, a denormalized form of FP32 is:

$$value = (-1)^{sign} \times 0.man \times 2^{-126}.$$

Although the values of the exponent bit of the denormalized form are all 0, since a decimal value is 0. man instead of 1. man, if successive several bits decreasing from the MSB of the mantissa bit are all 0, actually, the power of the denormalized number is decreased. For example, when the decimal value is 0.001, equivalently, the decimal value is 0.1 and the power is moved down by 2 bits; in other words, $$(-1)^{sign} \times 0.001 \times 2^{-126} = (-1)^{sign} \times 0.1 \times 2^{-2} \times 2^{-126} = (-1)^{sign} \times 0.1 \times 2^{-128}.$$

Since the mantissa bit of FP32 has 23 bits, a value range of the denormalized form of FP32 is between $[2^{-149}, 2-126)$, where $2^{-149}=2^{-126-23}$.

TF32 is a kind of relatively low-precision data type, and a data type of the TF32 includes a 1-bit sign bit (sign), an 8-bit exponent bit (exp), and a 10-bit mantissa bit (man), totaling 1+8+10=19 bits, where TF32[18] is the sign bit, TF32[17:10] is the exponent bit, and TF32[9:0] is the mantissa bit; in other words, a 0th bit TF32[0] in 19 bits holds an LSB of the mantissa bit, a 10th bit TF32[9] holds an MSB of the mantissa bit, a 11th bit TF32[10] holds an LSB of the exponent bit, a 18th bit TF32[17] holds an MSB of the exponent bit, and the highest bit TF32[18] of the whole sequence contains sign information. A normalized form of TF32 is:

$$value = (-1)^{sign} \times 1.man \times 2^{exp-127}.$$

However, a denormalized form of TF32 is:

$$value = (-1)^{sign} \times 0.man \times 2^{-126}.$$

Since the number of bits of the exponent bit of TF32 is the same as that of FP32, a value range of the normalized form of TF32 is the same as that of FP32. However, since the mantissa bit of TF32 has only 10 bits, a value range of the denormalized form of TF32 is between $[2^{-136}, 2^{-126})$, where $2^{-136}=2^{-126-10}$.

FP16 is another kind of relatively low-precision data type, and a data type of the FP16 includes a 1-bit sign bit (sign), a 5-bit exponent bit (exp), and a 10-bit mantissa bit (man), totaling 1+5+10=16 bits, where FP16[15] is the sign bit, FP16[14:10] is the exponent bit, and FP16[9:0] is the mantissa bit; in other words, a 0th bit FP16[0] in 16 bits holds an LSB of the mantissa bit, a 10th bit FP16[9] holds an MSB of the mantissa bit, a 11th bit FP16[10] holds an LSB of the exponent bit, a 15th bit FP16[14] holds an MSB of the exponent bit, and the highest bit FP16[15] of the whole sequence contains sign information. A normalized form of FP16 is:

$$value = (-1)^{sign} \times 1.man \times 2^{exp-15}.$$

A value range of FP16 is between $[2^{-14}, 2^{16})$. However, a denormalized form of FP16 is:

$$value = (-1)^{sign} \times 0.man \times 2^{-14}.$$

Since the mantissa bit of FP16 has only 10 bits, a value range of the denormalized form of FP16 is between $[2^{-24}, 2^{-14})$.

It may be understood that the more bits the sequence has, the more information the sequence may carry, so the higher the numerical precision of the data is. Generally speaking, input data is of a high-precision data type, such as FP32. However, in a neural network model, moving and operations of high-precision data cost too much hardware resources, so in some layers, such as a convolution layer or a fully connected layer, the precision of the data may be appropriately reduced under the premise of controllable loss. For example, the data type of FP32 is converted into the data type of TF32 or FP16, as long as the loss of the precision does not make the error of the operation result is too large. By such a data type conversion, the pressure on the hardware may be released.

The present disclosure provides a stochastic rounding data type conversion scheme that may maintain certain precision after repeated iterative operations.

Figure 2:
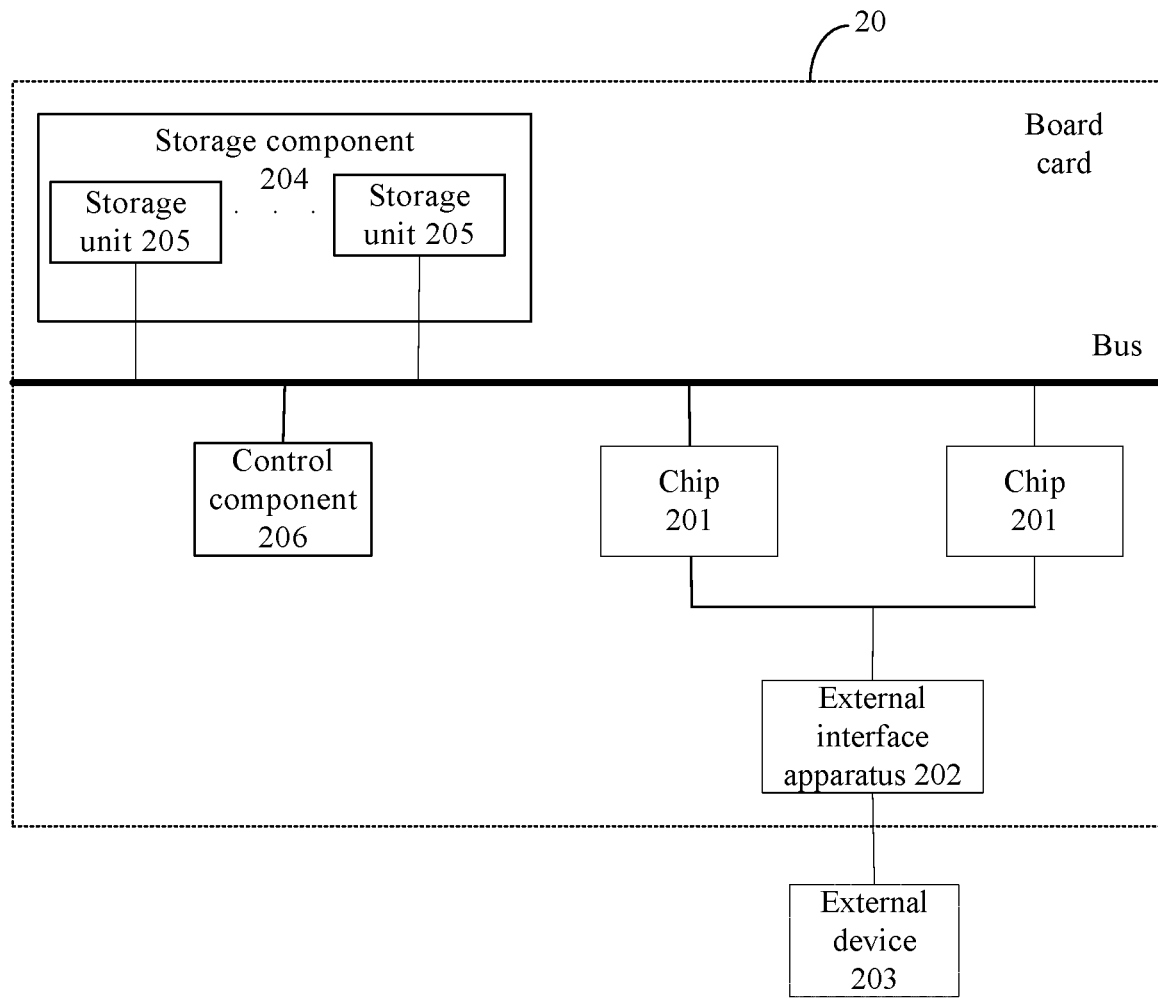
FIG. 2 is a structural diagram of a board card according to an embodiment of the present disclosure.

FIG. 2 is a schematic structural diagram of a board card 20 according to an embodiment of the present disclosure. As shown in FIG. 2, the board card 20 includes a chip 201, which is a system on chip (SoC), or called an on-chip system, and integrates one or a plurality of combined processing apparatuses. The combined processing apparatus is an artificial intelligence operation unit, which is configured to support various deep learning algorithms and various machine learning algorithms and meet requirements of intelligent processing in complex scenarios in computer vision, speech, natural language processing, data mining, and other fields.

The chip 201 is connected to an external device 203 through an external interface apparatus 202. The external device 203 may be, for example, a server, a computer, a camera, a monitor, a mouse, a keyboard, a network card, or a WIFI interface. To-be-processed data may be transferred from the external device 203 to the chip 201 through the external interface apparatus 202. A computing result of the chip 201 may be transferred back to the external device 203 through the external interface apparatus 202. According to different application scenarios, the external interface apparatus 202 may have different interface forms, such as a peripheral component interface express (PCIe) interface, and the like.

The board card 20 further includes a storage component 204 configured to store data. The storage component 104 includes one or a plurality of storage units 205. The storage component 204 is connected to and transfers data to a control component 206 and the chip 201 through a bus. The control component 206 in the board card 20 is configured to regulate and control a state of the chip 201. As such, in an application scenario, the control component 206 may include a micro controller unit (MCU).

Figure 3:
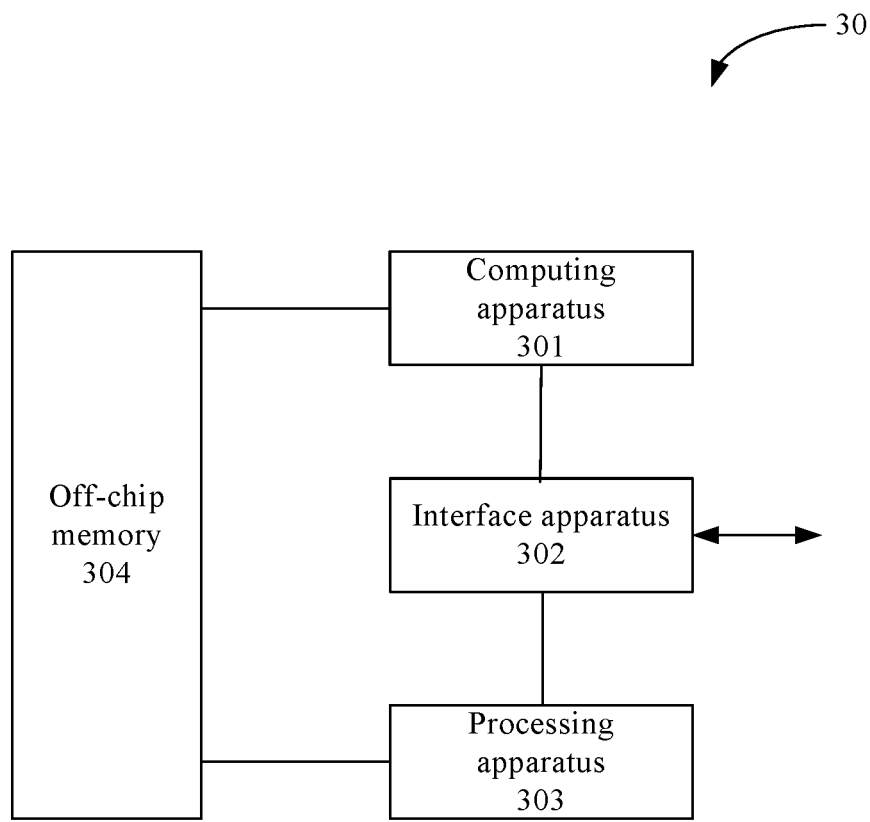
FIG. 3 is a structural diagram of an integrated circuit apparatus according to an embodiment of the present disclosure.

FIG. 3 is a structural diagram of a combined processing apparatus in the chip 201 of this embodiment. As shown in FIG. 3, a combined processing apparatus 30 includes a computing apparatus 301, an interface apparatus 302, a processing apparatus 303, and an off-chip memory 304.

The computing apparatus 301 is configured to perform an operation specified by a user. The computing apparatus 301 is mainly implemented as a single-core intelligent processor or a multi-core intelligent processor and is configured to perform deep learning computing or machine learning computing. The computing apparatus 301 interacts with the processing apparatus 303 through the interface apparatus 302 to jointly complete an operation specified by a user.

The interface apparatus 302 is configured to transfer data and control instructions between the computing apparatus 301 and the processing apparatus 303. For example, the computing apparatus 301 may acquire input data from the processing apparatus 303 via the interface apparatus 302 and write the input data to an on-chip storage apparatus of the computing apparatus 301. Further, the computing apparatus 301 may acquire control instructions from the processing apparatus 303 via the interface apparatus 302 and write the control instructions to an on-chip control cache of the computing apparatus 301. Alternatively or optionally, the interface apparatus 302 may further read data in the storage apparatus of the computing apparatus 301 and then transfer the data to the processing apparatus 303.

The processing apparatus 303 serves as a general processing apparatus and performs basic controls, including but not limited to, moving data, starting and/or stopping the computing apparatus 301. According to different implementations, the processing apparatus 303 may be a central processing unit (CPU), a graphics processing unit (GPU), or one or more of other general and/or dedicated processors. These processors include but are not limited to a digital signal processor (DSP), an application specific integrated circuit (ASIC), a field-programmable gate array (FPGA), or other programmable logic components, discrete gate or transistor logic components, discrete hardware components, and the like. Moreover, the number of the processors may be determined according to actual requirements. As described above, with respect to the computing apparatus 301 of the present disclosure only, the computing apparatus 201 of the present disclosure may be viewed as having a single-core structure or an isomorphic multi-core structure. However, when considered together, the computing apparatus 301 and the processing apparatus 303 are viewed as forming a heterogeneous multi-core structure.

The off-chip memory 304 is configured to store to-be-processed data. The off-chip memory 304 is a double data rate (DDR) memory with a size of 16 G or more than 16 G generally. The off-chip memory 304 is configured to save data of the computing apparatus 301 and/or the processing apparatus 303.

Figure 4:
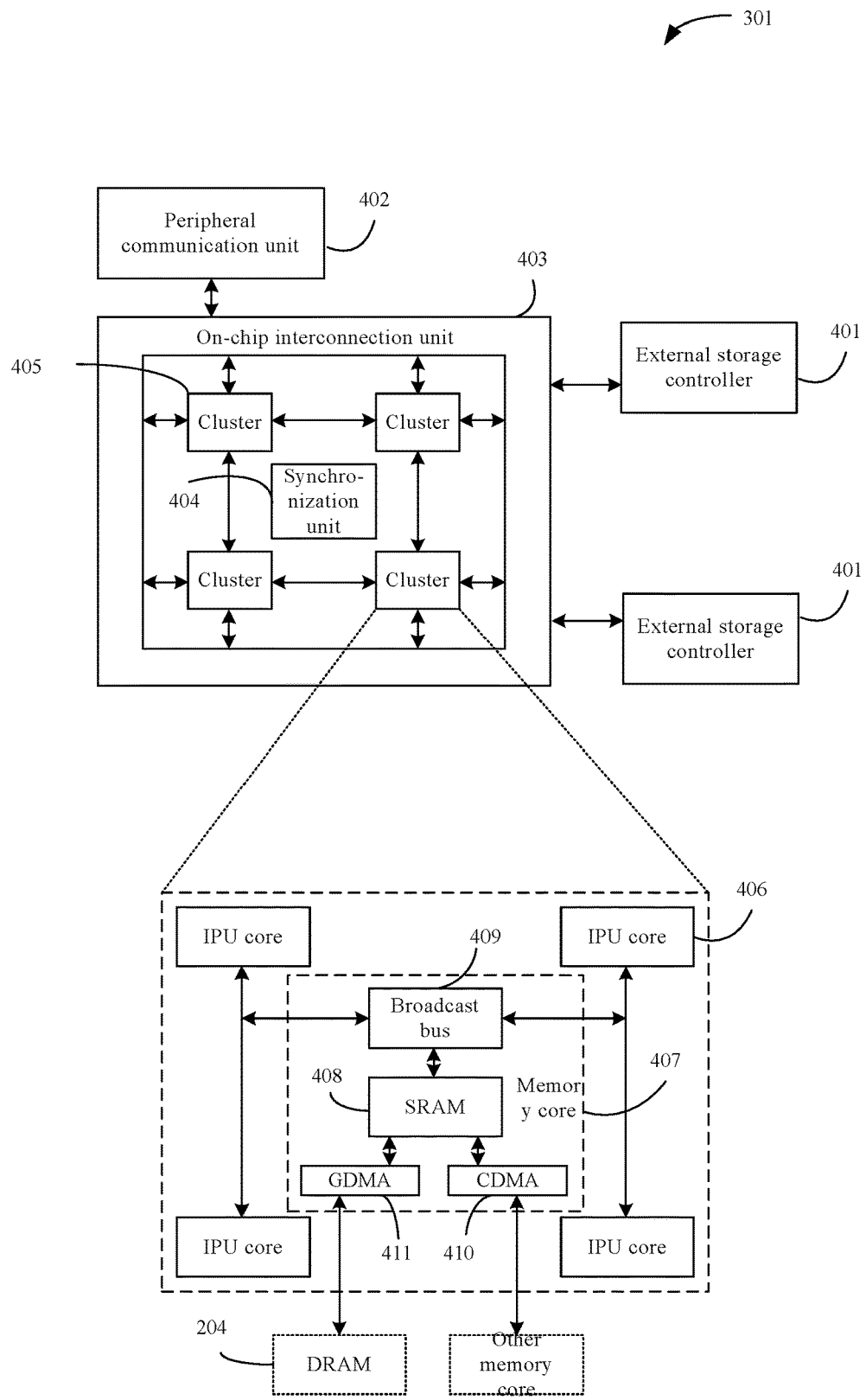
FIG. 4 is a schematic diagram of an internal structure of a computing apparatus according to an embodiment of the present disclosure.

FIG. 4 is a schematic diagram of an internal structure of the computing apparatus 301. The computing apparatus 301 is configured to process input data in computer vision, speech, natural language, and data mining. The computing apparatus 301 in the figure is designed in a multi-core hierarchical structure. The computing apparatus 301 serves as an on-chip system and includes a plurality of clusters, where each cluster further includes a plurality of IPU cores. In other words, the computing apparatus 301 is composed of a hierarchy of on-chip system-cluster-IPU core.

In terms of a hierarchy of the on-chip system, as shown in FIG. 4, the computing apparatus 301 includes an external storage controller 401, a peripheral communication unit 402, an on-chip interconnection unit 403, a synchronization unit 404, and a plurality of clusters 405.

There may be a plurality of external storage controllers 401, two of which are exemplified in the figure. The external storage controllers 401 are configured to, in response to access requests from the IPU cores, access an external storage device, such as the off-chip memory 304 in FIG. 3, to read or write data off-chip. The peripheral communication unit 402 is configured to receive a control signal from the processing apparatus 303 through the interface apparatus 302 to start the computing apparatus 301 to perform a task. The on-chip interconnection unit 403 connects the external storage controller 401, the peripheral communication unit 402, and the plurality of clusters 405 and is configured to transfer data and control signals among the units.

The synchronization unit 404 is a global barrier controller (GBC) and is configured to coordinate a work progress of each cluster to ensure synchronization of information. The plurality of clusters 405 are computing cores of the computing apparatus 301, four of which are illustrated in the figure.

In terms of a hierarchy of the clusters, as shown in FIG. 4, each cluster 405 includes a plurality of IPU cores 406 and a memory core (MEM core) 407.

Figure 5:
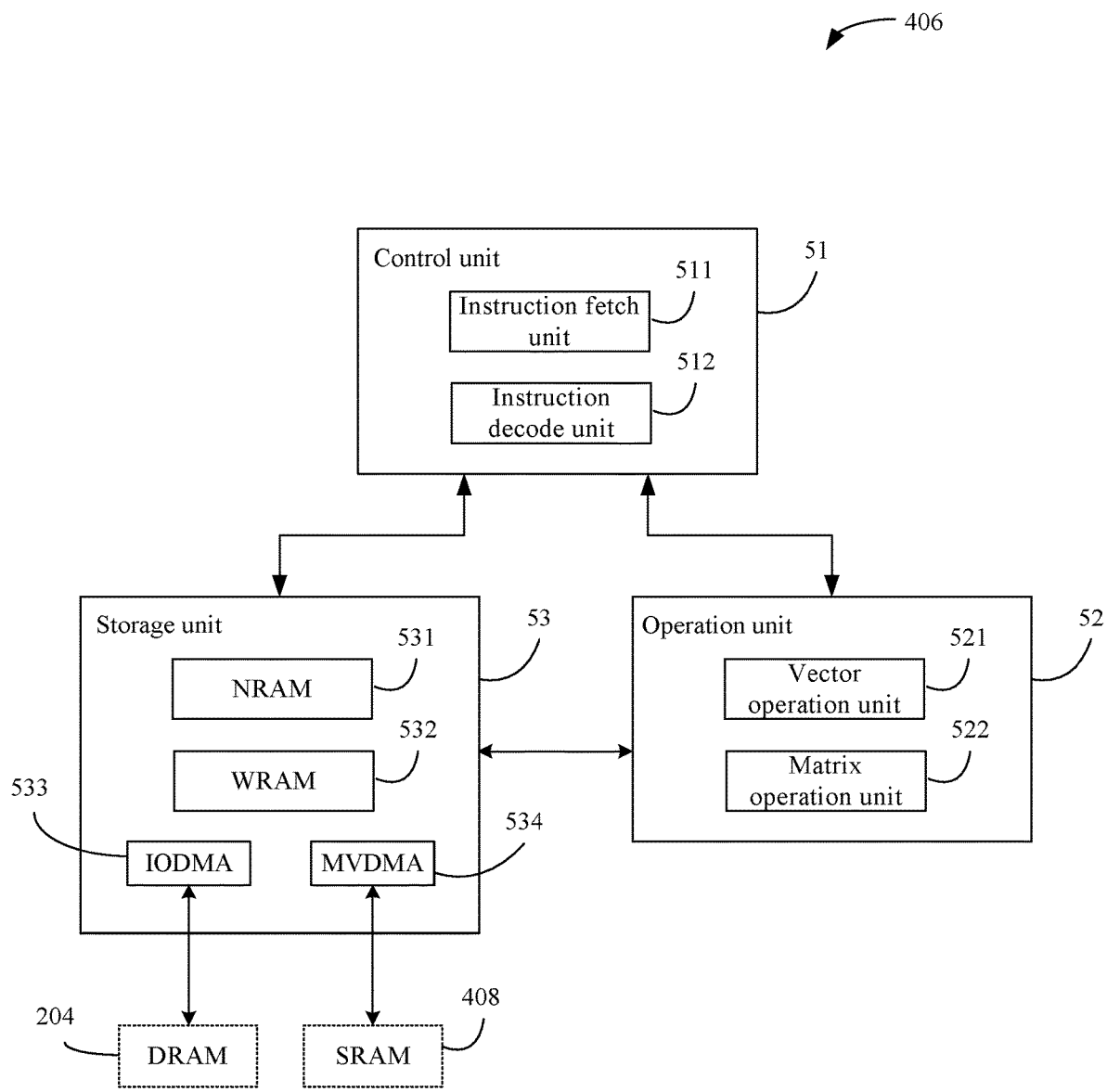
FIG. 5 is a schematic diagram of an internal structure of an IPU (intelligent processing unit) core according to an embodiment of the present disclosure.

Four IPU cores 406 are illustrated in the figure. The present disclosure does not limit the number of the IPU cores 406. An internal architecture of the IPU core 406 is shown in FIG. 5. Each IPU core 406 includes three units: a control unit 51, an operation unit 52, and a storage unit 53.

The control unit 51 is configured to coordinate and control work of the operation unit 52 and the storage unit 53 to complete a deep learning task. The control unit 51 includes an instruction fetch unit (IFU) 511 and an instruction decode unit (IDU) 512. The IFU 511 is configured to acquire an instruction from the processing apparatus 303. The IDU 512 is configured to decode the instruction acquired and send a decoding result as control information to the operation unit 52 and the storage unit 53.

The operation unit 52 includes a vector operation unit 521 and a matrix operation unit 522. The vector operation unit 521 is configured to perform a vector operation and supports complex operations, such as vector multiplication, addition, and nonlinear conversion. The matrix operation unit 522 is responsible for core computing of deep learning algorithms, which includes matrix multiplication and convolution.

The storage unit 53 is configured to store or move related data and includes a neuron random access memory (NRAM) 531, a weight RAM (WRAM) 532, an input/output direct memory access (IODMA) unit 533, and a move direct memory access (MVDMA) unit 534. The NRAM 531 is configured to store a feature map for computing by the IPU cores 406 and an intermediate result after the computing. The WRAM 532 is configured to store a weight of a deep learning network. The IODMA 533 controls memory accesses of the NRAM 531/the WRAM 532 and the off-chip memory 304 through a broadcast bus 409. The MVDMA 534 is configured to control memory accesses of the NRAM 531/the WRAM 532 and a shared RAM (SRAM) 408.

Going back to FIG. 4, the memory core 407 is mainly used for storage and communication. In other words, the memory core 407 is mainly used for storing shared data or intermediate results between the IPU cores 406 and performing communications between the clusters 405 and the off-chip memory 304, communications between the clusters 405, and communications between the IPU cores 406. In other embodiments, the memory core 407 is capable of performing a scalar operation and is configured to perform the scalar operation.

The memory core 407 includes the SRAM 408, the broadcast bus 409, a cluster direct memory access (CDMA) unit 410, and a global direct memory access (GDMA) unit 411. The SRAM 408 plays the role of a high-performance data transfer station. Data reused among different IPU cores 406 in the same cluster 405 is not required to be acquired separately from the off-chip memory 304 through the IPU cores 406. Instead, the data is transferred among the IPU cores 406 through the SRAM 408. The memory core 407 is only required to quickly distribute the reused data from the SRAM 408 to the plurality of IPU cores 406, so as to improve inter-core communication efficiency and greatly decrease on-chip/off-chip input/output access.

The broadcast bus 409, the CDMA 410, and the GDMA 411 are used for performing the communication between the IPU cores 406, the communication between the clusters 405, and data transfer between the clusters 405 and the off-chip memory 304, respectively. The above will be explained separately below.

The broadcast bus 409 is used for completing high-speed communication between the IPU cores 406 in the clusters 405. The broadcast bus 409 of this embodiment supports inter-core communication modes including unicast, multicast, and broadcast. The unicast refers to point-to-point (single IPU core-to-single IPU core) data transfer. The multicast refers to a communication mode for transferring one copy of data from the SRAM 408 to a certain number of IPU cores 406. The broadcast refers to a communication mode for transferring one copy of data from the SRAM 408 to all IPU cores 406. The broadcast is a special case of the multicast.

The CDMA 410 is used for controlling memory access of the SRAM 408 among different clusters 405 in the same computing apparatus 301.

The GDMA 411 works with the external storage controller 401 to control memory access from the SRAM 408 in the clusters 405 to the off-chip memory 304 or read data from the off-chip memory 304 to the SRAM 408. It may be known from the above that communication between the off-chip memory 304 and the NRAM 531 or the WRAM 532 may be implemented through two channels. A first channel is to directly contact the off-chip memory 304 with the NRAM 531 or the WRAM 532 through the IODAM 533. A second channel is to transfer the data between the off-chip memory 304 and the SRAM 408 through the GDMA 411 first, and then to transfer the data between the SRAM 408 and the NRAM 531 or the WRAM 532 through the MVDMA 534.

In the operation of the neural network model, the computing apparatus 301 of this embodiment converts input data from a high-precision data type to a low-precision data type, and then performs moving or operations based on the low-precision data type to save hardware resources. In more detail, the computing apparatus 301 converts the input data from a first data type to a second data type, where the first data type is high-precision, such as FP32, and the second data type is low-precision, such as TF32 or FP16. Speaking by example, the computing apparatus 301 converts the data type of the input data from FP32 to TF32 or FP16, and then processes the data. The present disclosure does not limit specific data types before and after the data type conversion.

As previously mentioned, each data type is represented by a sign bit, an exponent bit, and a mantissa bit. It is just that the number of bits of exponent bits and/or mantissa bits of different data types may not be the same. For convenience, it is defined here that a first data type is represented by a first sign bit, a first exponent bit, and a first mantissa bit, while a second data type is represented by a second sign bit, a second exponent bit, and a second mantissa bit. Numbers of bits of the first exponent bit and the second exponent bit may be different, and numbers of bits of the first mantissa bit and the second mantissa bit may also be different. A sign of a floating-point number does not change during a data type conversion, so a value of a second sign bit directly corresponds to a value of a first sign bit. The data type conversion mechanism of this embodiment is special in that a first exponent bit is converted to a second exponent bit and a first mantissa bit is converted to a second mantissa bit through a set of evaluation methods to achieve a process of converting input data from a first data type to a second data type.

In this embodiment, when performing the data type conversion, the control unit 51 is configured to send an instruction to the operation unit 52 and the storage unit 53, and the operation unit 52 and the storage unit 53 are executed in response to the received instruction. In more detail, the instruction fetch unit 511 acquires an instruction from the processing apparatus 303; the instruction decode unit 512 decodes the acquired instruction and sends a decoding result as multiple control information to the operation unit 52 and the storage unit 53 in a certain sequence, so that the operation unit 52 and the storage unit 53 perform tasks in order according to the control information, achieving the data type conversion on the whole.

Neuron data and weight data required for the operation are input data of this embodiment. These pieces of input data are loaded from the off-chip memory 304 to the SRAM 408, and after splitting, these pieces of input data are loaded from the SRAM 408 to the storage unit 53 of each IPU core 406, where the neuron data is temporarily stored in the NRAM 531, and the weight data is temporarily stored in the WRAM 532. According to the control information, the storage unit 53 sends the temporarily stored input data to the operation unit 52 for the data type conversion at the appropriate time point.

Figure 6:
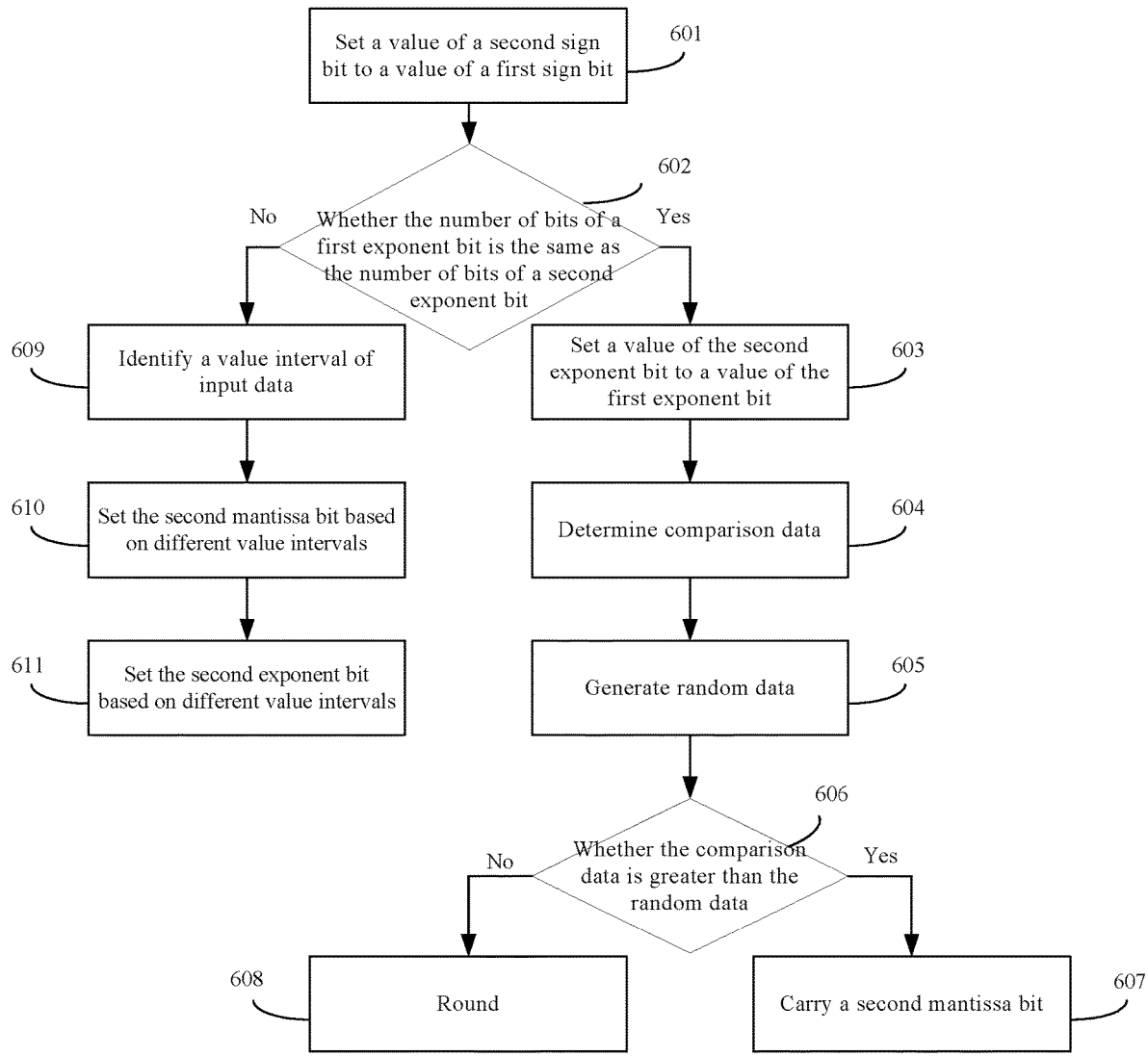
FIG. 6 is a flowchart of converting input data from a first data type to a second data type according to an embodiment of the present disclosure.

The operation unit 52 also performs a data type conversion operation based on the control information from the instruction decode unit 512. In more detail, this embodiment performs the data type conversion operation through the vector operation unit 521. FIG. 6 is a flowchart of converting input data from a first data type to a second data type according to an embodiment of the present disclosure.

In a step 601, a value of a second sign bit is set to a value of a first sign bit. As previously mentioned, no matter how the data type conversion is performed, a sign of input data does not change, so the operation unit 52 directly sets the value of the second sign bit to the value of the first sign bit.

In a step 602, the operation unit 52 judges whether the number of bits of a first exponent bit is the same as the number of bits of a second exponent bit. If the number of bits of the first exponent bit is the same as the number of bits of the second exponent bit, a step 603 is performed, where the operation unit 52 directly sets a value of the second exponent bit to a value of the first exponent bit. Taking a conversion from FP32 to TF32 as an example, the operation unit 52 judges that an exponent bit (a first exponent bit) of FP32 data has 8 bits, while an exponent bit (a second exponent bit) of TF32 data also has 8 bits, and numbers of bits of the exponent bits of the two data types are the same. The operation unit 52 directly sets a value of the exponent bit of TF32 data to a value of the exponent bit of FP32 data.

In a step 604, the operation unit 52 further determines comparison data for the number of bit difference between a first mantissa bit and a second mantissa bit in the first mantissa bit. Since a mantissa bit (a first mantissa bit) of FP32 data has 23 bits and a mantissa bit (a second mantissa bit) of TF32 data has only 10 bits, the number of bit difference between the first mantissa bit and the second mantissa bit is 23−10=13. On the premise that the number of bits of the first exponent bit is the same as the number of bits of the second exponent bit, the comparison data refers to continuous data truncated from the lowest bit to a high bit in the first mantissa bit, and the number of bits of the comparison data is the number of bit difference. In other words, 13-bit data continuously truncated from the lowest bit LSB to the high bit in the first mantissa bit is the comparison data.

Figure 7:
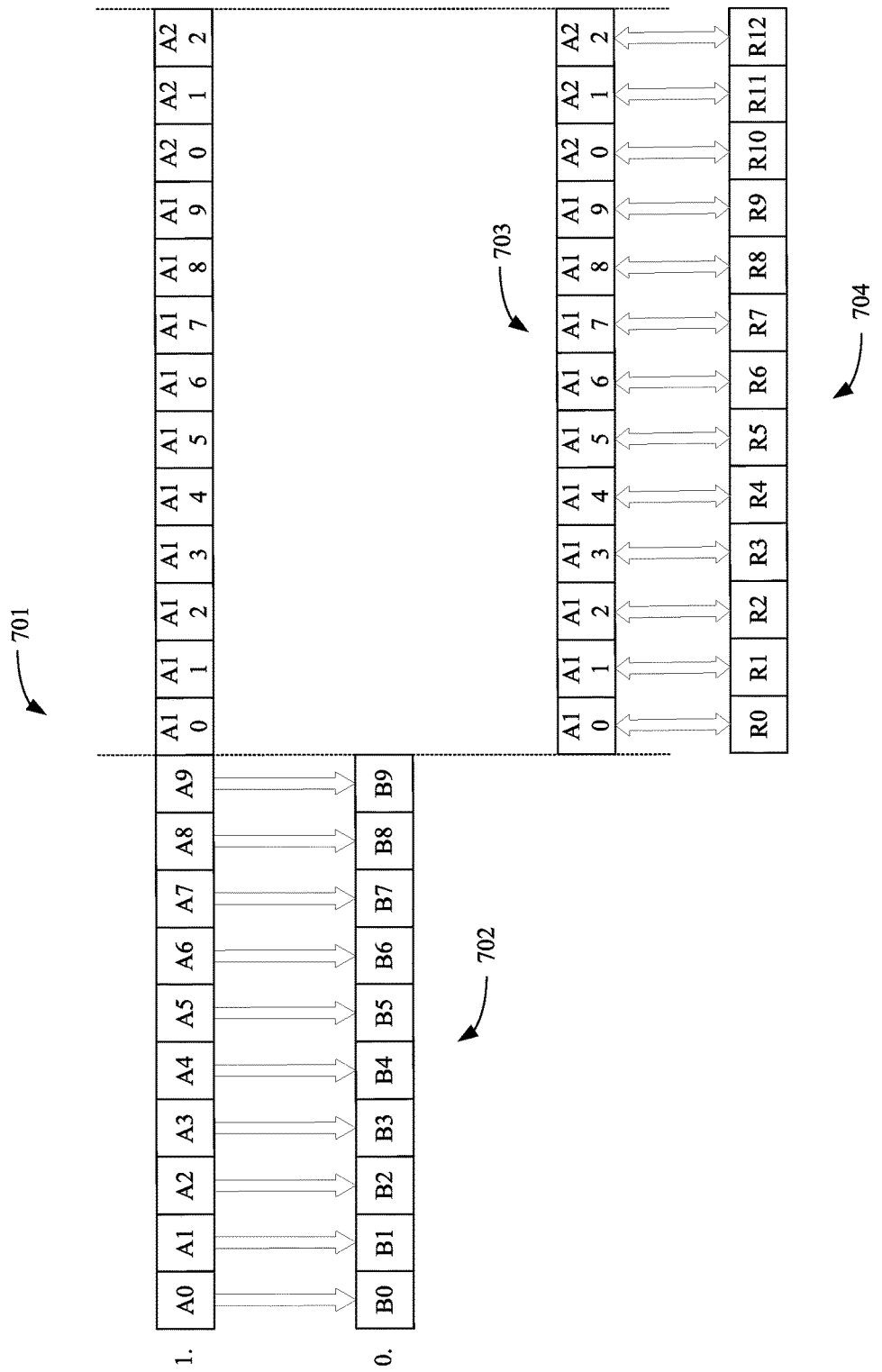
FIG. 7 is a schematic diagram of determining comparison data on the premise that the number of bits of a first exponent bit is the same as the number of bits of a second exponent bit.

FIG. 7 is a schematic diagram of determining comparison data on the premise that the number of bits of a first exponent bit is the same as the number of bits of a second exponent bit. A first mantissa bit 701 of FP32 data has 23 bits, including A0 to A22 from high to low respectively. A second mantissa bit 702 of TF32 data has 10 bits, including B0 to B9 from high to low respectively. The operation unit 52 directly sets the 10-bit mantissa bit of the second mantissa bit 702 of the TF32 data to the highest top 10 bits of the first mantissa bit 701. As shown in the figure, values of B0 to B9 in the second mantissa bit 702 are set to values of A0 to A9 in the first mantissa bit 701 respectively.

Furthermore, the number of bit difference between the first mantissa bit 701 and the second mantissa bit 702 is 23−10=13; in other words, the first mantissa bit 701 has more 13 bits than the second mantissa bit 702. The operation unit 52 continuously truncates 13 bits of data from the lowest bit A22 to a high bit in the first mantissa bit 701. These 13 bits of data A10 to A22 are comparison data 703.

In a step 605, random data is generated, where the number of bits of the random data is the number of bit difference. In this embodiment, the random data may be generated by the processing apparatus 303 and then sent to the storage unit 53 for temporary storage along with the input data, or a value of each bit of the random data is randomly generated by the memory core 407 and then sent to the storage unit 53 for temporary storage along with the input data. A sequence 704 in FIG. 7 is random data, whose length is the same as that of the comparison data 703; in other words, the number of bits of the sequence 704 is the number of bit difference, which is 13 bits, including R0 to R12 from high to low respectively.

In a step 606, the operation unit 52 then judges whether the comparison data 703 is greater than the random data. Based on the control information, the storage unit 53 sends random data 704 to the operation unit 52, so that the operation unit 52 judges whether a value of the comparison data 703 is greater than a value of the random data 704. If the comparison data 703 is greater than the random data 704, it is represented that the comparison data 703 is large enough and is required to be carried to B9; and if the comparison data 703 is not greater than the random data 704, it is represented that the comparison data 703 is not large enough and may be rounded directly.

When judging whether the value of the comparison data 703 is greater than the value of the random data 704, the operation unit 52 will first judge value sizes of most significant bits of the comparison data 703 and the random data 704; in other words, the operation unit 52 will first judge sizes of A10 and R0. If the A10 is 1 and the R0 is 0, the comparison data 703 will be greater than the random data 704, regardless of values of the other bits; if the A10 is 0 and the R0 is 1, then the comparison data 703 will be less than the random data 704, regardless of the values of the other bits; and if the A10 and the R0 are both 0 or 1, then the operation unit 52 further judges sizes of secondary high bits; in other words, the operation unit 52 further judges sizes of A11 and R1 in the same way that the operation unit 52 judges the sizes of the A10 and the R0. If two values of the same place are of the same size, the operation unit 52 continues to compare values of secondary low bits until A22 and R12. If sizes of the A22 and the R12 are still the same, it is represented that the comparison data 703 has exactly the same value as the random data 704.

When the comparison data 703 is greater than the random data 704, it is represented that the comparison data 703 is large enough and requires a carry during a data type conversion, and then a step 607 is performed to carry the second mantissa bit 702. The operation unit 52 adds one to a value of the second mantissa bit 702 as a value of a second mantissa bit 702 after the data type conversion. For example, if [A0 A1 A2 A3 A4 A5 A6 A7 A8 A9]=[1 0 0 1 0 0 1 1 1 0], then after the carry, [B0 B1 B2 B3 B4 B5 B6 B7 B8 B9]=[1 0 0 1 0 0 1 1 1 1], and a value of B9 is a value of A9 plus one. If the value of the A9 is 1 originally, then the value of the B9 is 0, and then the carry is performed on B8, and so on.

In an extreme case, if all bits (A0 to A9) of the first mantissa bit 701 corresponding to the second mantissa bit 702 are 1 and a carry is required, the second mantissa bit 702 has no more bits to hold information of the carry. In this case, all bits of the second mantissa bit 702 also present values after the carry; in other words, [B0 B1 B2 B3 B4 B5 B6 B7 B8 B9]=[0 0 0 0 0 0 0 0 0 0]. This embodiment uses the second exponent bit to record information about the highest bit of the second mantissa bit 702 after the carry. In more detail, the operation unit 52 adds one to a value of the second exponent bit. For example, if the first exponent bit is 16, then the second exponent bit is also 16. In this case, the operation unit 52 adjusts the second exponent bit to 16+1=17. For example, if the first exponent bit is −20, the second exponent bit is −20+1=−19. Within the scope disclosed by the present disclosure, as long as such an extreme case occurs, which means that the number of bits of the mantissa bit in the carry is insufficient to record the information of the carry, the data is processed in this way and will not be repeated in the following.

When the comparison data 703 is not greater than the random data 704, it is represented that a value of the comparison data 703 is too small. At this time, a step 608 is performed to directly round the data, and the second mantissa bit 702 is not carried, which means that [B0 B1 B2 B3 B4 B5 B6 B7 B8 B9]=[A0 A1 A2 A3 A4 A5 A6 A7 A8 A9].

In other cases, a data type conversion method that the comparison data 703 is equal to the random data 704 may be applicable to a data type conversion method that the comparison data 703 is greater than the random data 704; in other words, the present disclosure does not limit the carry and rounding processing method when the comparison data 703 is equal to the random data 704, and the data may be carried or rounded according to actual situations. Within the scope disclosed by the present disclosure, as long as the comparison data 703 is equal to the random data 704, the data is processed in this way and will not be repeated in the following.

Going back to the step 602, if the operation unit 52 judges that the number of bits of the first exponent bit is different from the number of bits of the second exponent bit, a step 609 is performed, and the operation unit 52 further identifies an interval in which a value of input data falls, and different intervals have different data type conversion methods. As mentioned earlier, a value range of a normalized number depends on the number of bits of an exponent bit, while a value range of a denormalized number depends on the number of bits of an exponent bit plus the number of bits of a mantissa bit.

In this embodiment, which intervals are specifically divided and a value range of each interval are determined based on a first data type and a second data type. For ease of illustration, it is defined that: a normalized number of a first data type has a value range between $2^{first\ interval\ number}$ and $2^{first\ upper\ limit}$, a denormalized number of the first data type has a value range between $2^{first\ lower\ limit}$ and $2^{first\ interval\ number}$, a normalized number of a second data type has a value range between $2^{second\ interval\ number}$ and $2^{second\ upper\ limit}$ and a denormalized number of the second data type has a value range between $2^{second\ lower\ limit}$ and $2^{second\ interval\ number}$.

Continuing with the example of converting the data type from FP32 to FP16, as mentioned earlier, a value range of a normalized number of FP32 is $[2^{-126}, 2^{128})$ and a value range of a denormalized number of FP32 is $[2^{-149}, 2^{-126})$, so according to the definition, a first upper limit is 128, a first interval number is −126, and a first lower limit is −149. A value range of a normalized number of FP16 is $[2^{-14}, 2^{16})$ and a value range of a denormalized number of FP16 is $[2^{-24}, 2^{-14})$, so a second upper limit is 16, a second interval number is −14, and a second lower limit is −24.

This embodiment defines five different intervals by ordering sizes of the first upper limit, second upper limit, second interval number, second lower limit, and first lower limit. Specifically, a first interval is $[2^{second\ upper\ limit}, 2^{first\ upper\ limit})$, a second interval is $[2^{second\ interval\ number}, 2^{second\ upper\ limit})$, a third interval is $[2^{second\ lower\ limit}, 2^{second\ interval\ number})$, a fourth interval is $[2^{second\ lower\ limit-1}, 2^{second\ lower\ limit})$, and a fifth interval is $[2^{first\ lower\ limit}, 2^{second\ lower\ limit-1})$. Corresponding to the example of converting the data type from FP32 to FP16, the first interval is $[2^{16}, 2^{128})$, the second interval is $[2^{-14}, 2^{16})$, the third interval is $[2^{-24}, 2^{-14})$, the fourth interval is $[2^{-25}, 2^{-24})$, and the fifth interval is $[2^{-149}, 2^{-25})$.

In a step 610, the second mantissa bit is set based on different value intervals. The operation unit 52 identifies an interval in which a value of input data of a first data type falls, and different intervals adopt different data type conversion methods or rules. The following continues to take the conversion of the data type from to FP32 to FP16 as an example to explain a corresponding data type conversion method or rule of each interval respectively.

When the value of the input data is identified as falling in the first interval $[2^{16}, 2^{128})$ in the step 609, it is represented that the input data of the FP32 data type overflows the range that the FP16 data type may represent. Therefore, in the step 610, the operation unit 52 sets the second mantissa bit to overflow, so as to convert the input data of the FP32 data type to infinity of the FP16 data type; in other words, the operation unit 52 sets all values of the second mantissa bit to 0. Next, in a step 611, the second exponent bit is set based on different value intervals. Because of the overflow, the operation unit 52 sets all values of the second exponent bit to 1.

When the value of the input data is identified as falling in the second interval $[2^{-14}, 2^{16})$ in the step 609, it is represented that the value of the input data falls within the normalized number range of FP16. In the step 610, the operation unit 52 further determines comparison data for the number of bit difference between the first mantissa bit and the second mantissa bit. In the operation of determining the comparison data, since a mantissa bit (a first mantissa bit) of FP32 has 23 bits and a mantissa bit (a second mantissa bit) of FP16 has only 10 bits, the number of bit difference between the first mantissa bit and the second mantissa bit is 23−10=13. The comparison data refers to continuous data truncated from low-bit data to high-bit data in the first mantissa bit. In other words, 13-bit data continuously truncated from the lowest bit LSB to a high bit in the first mantissa bit is the comparison data. The operation unit 52 sets the second mantissa bit as continuous data truncated from the highest-bit data to the low-bit data in the first mantissa bit, and the number of bits truncated is equal to the number of bits of the second mantissa bits, which is 10 bits.

After the comparison data is determined, random data is generated, where the number of bits of the random data is the number of bit difference. The operation unit 52 then judges whether the comparison data is greater than the random data. When the comparison data is greater than the random data, the operation unit 52 carries the second mantissa bit. When the comparison data is not greater than the random data, the second mantissa bit does not carry. In other words, when the value of the input data falls in the second interval $[2^{-14}, 2^{16})$, the second mantissa bit is set in the same way as shown in FIG. 7 and will not be repeated again.

In the step 611, the second exponent bit is set based on different value intervals. When the value of the input data falls in the second interval $[2^{-14}, 2^{16})$, the operation unit 52 sets the value of the exponent bit of FP16 data to be the same as that of the exponent bit of FP32 data, which is:

$$2^{first\ exponent\ bit\ value-first\ upper\ limit} = 2^{second\ exponent\ bit\ value-second\ upper\ limit}.$$

Therefore, the value of the second exponent bit=the value of the first exponent bit−the first upper limit+the second upper limit.

When the value of the input data is identified as falling in the third interval $[2^{-24}, 2^{-14})$ in the step 609, it is represented that the value of the input data falls within the denormalized number range of FP16. In the step 610, the operation unit 52 is also required to determine the comparison data for the number of bit difference between the first mantissa bit and the second mantissa bit in the first mantissa bit. The number of bit difference between the first mantissa bit and the second mantissa bit is also 13, but the determination of the comparison data is different from the previous one. In this case, the operation unit 52 selects bits with the number of continuous bit difference from the number of bits of the second mantissa bit–(the second interval number–the value of the first exponent bit+1) from the highest bit in the first mantissa bit as the comparison data.

Figure 8:
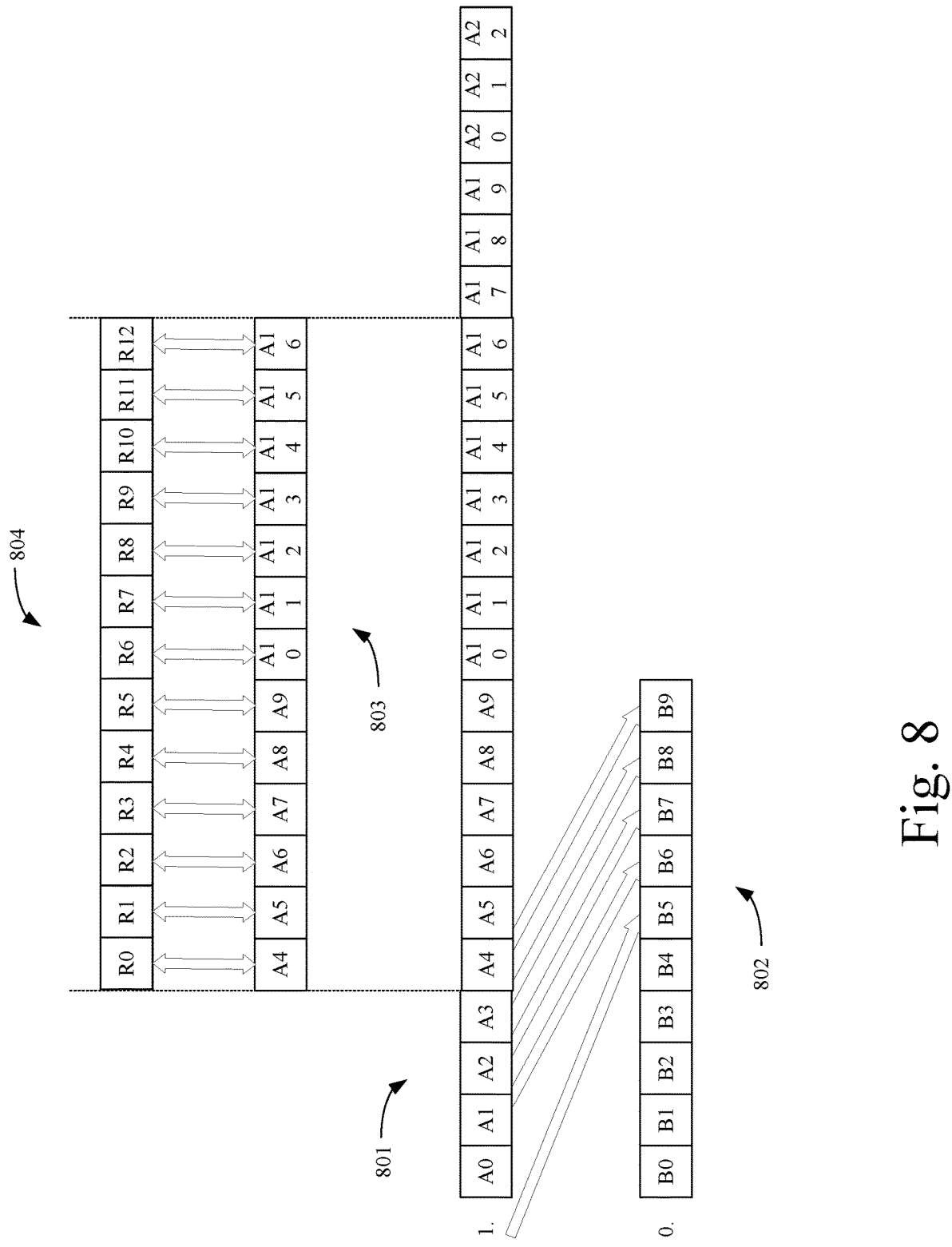
FIG. 8 is a schematic diagram of determining comparison data when a value of input data falls in a third interval.

FIG. 8 is a schematic diagram of determining comparison data when a value of input data falls in a third interval [$2^{-24}$, $2^{-14}$). A first mantissa bit 801 of input data of FP32 data type has 23 bits, including A0 to A22 from high to low respectively. A second mantissa bit 802 of data of FP16 data type after a data type conversion has 10 bits, including B0 to B9 from high to low respectively, where the number of bit difference between the first mantissa bit 801 and the second mantissa bit 802 is 23−10=13. In a specific example, it is assumed that a value of input data of FP32 data type is $(-1)^{sign} \times 1.\text{man} \times 2^{-20}$; in other words, a value of a first exponent bit is −20. The operation unit 52 first computes a starting bit of comparison data, which is 10−(−14−(−20)+1)=5. Comparison data 803 is 13 continuous bits from a fifth bit (A4), starting with the highest bit of the first mantissa bit 801, which is A4 to A16.

When setting the value of the second mantissa bit 802, the operation unit 52 sets values of B6 to B9 as values of A0 to A3 respectively. Since a mantissa form of a normalized number of FP32 is 1.man, a value of B5 is set to 1 in 1.man, and values of B0 to B4 are set to 0; in other words, the second mantissa bit 802 [B0 B1 B2 B3 B4 B5 B6 B7 B8 B9]=[0 0 0 0 0 1 A0 A1 A2 A3]. It may be known from the above explanation that the operation unit 52 first sets values of a specific number of bits of the second mantissa bit 802 from the highest bit as 0, where the specific number refers to a starting bit, whose computing formula is the number of bits of the second mantissa bit–(the second interval number–the value of the first exponent bit+1). Therefore, values of B0 to B4 are 0. Then, a (specific number+1)-th bit (B5) of the second mantissa bit 802 from the highest bit is set as 1. Finally, values of (specific number−1) bits of the second mantissa bit 802 from a (specific number+2)-th bit are set as values of (specific number−1) bits of the first mantissa bit 801 from the highest bit; in other words, B6=A0, B7=A1, B8=A2, B9=A3.

After setting the value of the second mantissa bit 802, the operation unit 52 judges whether the comparison data 803 is greater than random data 804. When the comparison data 803 is greater than the random data 804, it is represented that a carry is required to be performed. Specifically, the operation unit 52 carries B9. When the comparison data 803 is not greater than the random data 804, the carry is not required.

In the step 611, the second exponent bit is set. Since this interval is a denormalized representation range of a second data type, the operation unit 52 sets all values of the second exponent bit to 0.

When the value of the input data is identified as falling in the fourth interval [$2^{-25}$, $2^{-24}$) in the step 609, this situation should be an underflow since the value is beyond the representation range of FP16. However, considering that this interval may become the smallest denormalized number because of a carry, further judgment is required in the step 610.

In this interval, FP32 is expressed as:

$$(-1)^{sign} \times 1.\text{man}_1 \times 2^{-25}.$$

While FP16 is expressed as:

$$(-1)^{sign} \times 0.\text{man}_2 \times 2^{-24}.$$

Figure 9:
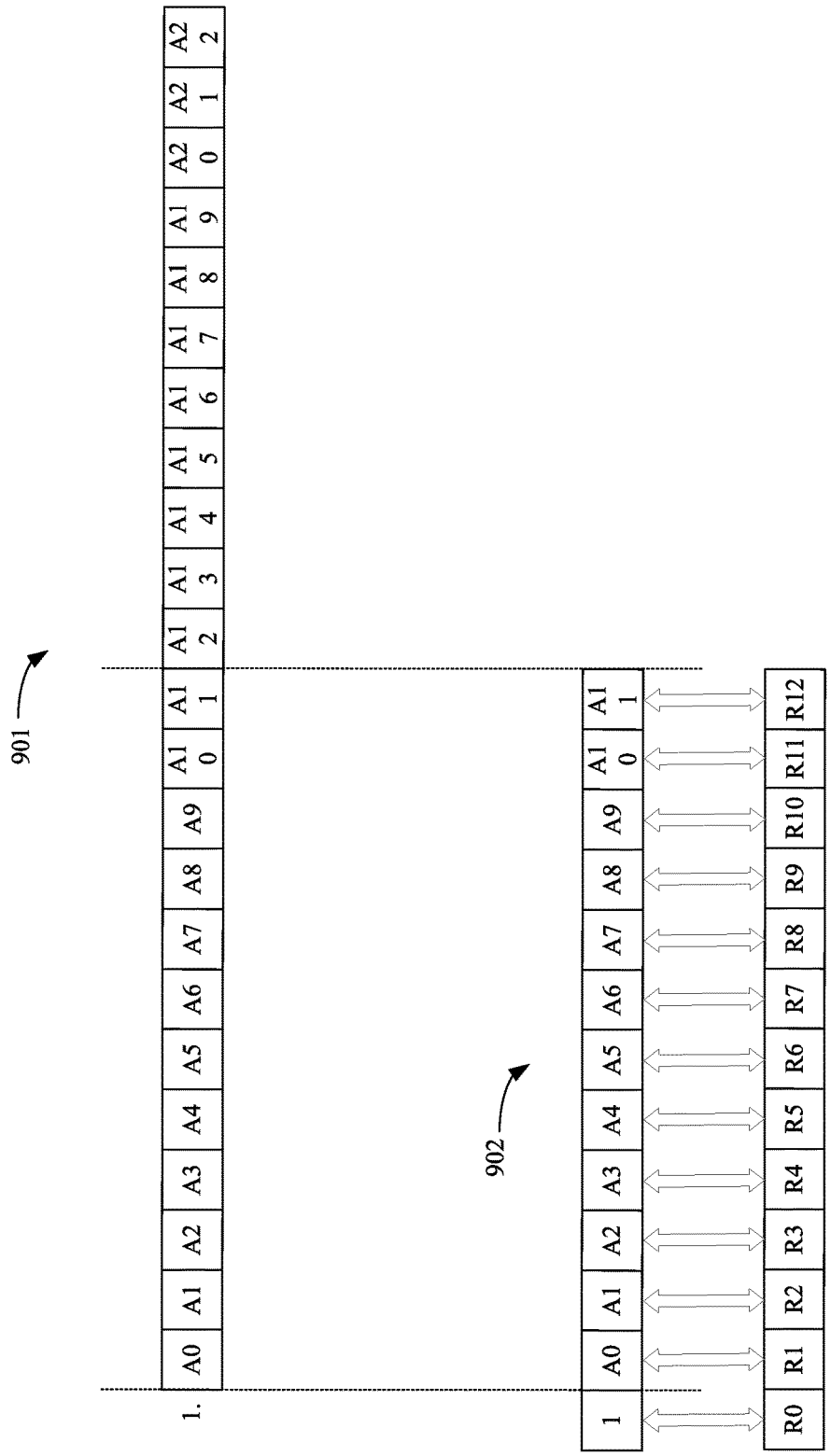
FIG. 9 is a schematic diagram of converting a data type of a mantissa bit when a value of input data falls in a fourth interval.

If the mantissa bit of FP32 is carried, considering that the first exponent bit is just one bit different from the second exponent bit, after the carry, the first mantissa bit becomes the second mantissa bit when the first mantissa bit is reduced by one bit, which is $\text{man}_2=[1\ \text{man}_1]$. FIG. 9 is a schematic diagram of converting a data type of a mantissa bit when a value of input data falls in a fourth interval. A mantissa bit 901 of FP32 data type has 23 bits of mantissa, including A0 to A22. In the operation of determining comparison data, since a mantissa bit of FP32 has 23 bits and a mantissa bit of FP16 has only 10 bits, the number of bit difference between a first mantissa bit and a second mantissa bit is 23−10=13, so comparison data 902 has 13 bits. The operation unit 52 first sets a value of the highest bit of comparison data 902 to 1, and then sets values of other bits of the comparison data 902 to values of first bits with the number of bit difference minus one in the first mantissa bit. Therefore, the comparison data 902 is acquired as [1 A0 A1 A2 A3 A4 A5 A6 A7 A8 A9 A10 A11].

Then, the operation unit 52 judges whether the comparison data 902 is greater than random data 903. When the comparison data 903 is greater than the random data 904, it is represented that a carry is required to be performed, and the operation unit 52 sets the second mantissa bit to a minimum value, which is [B0 B1 B2 B3 B4 B5 B6 B7 B8 B9]=[0 0 0 0 0 0 0 0 0 1].

When the comparison data 903 is not greater than the random data 904, it is represented that the carry is not required, and the operation unit 52 converts input data of FP32 to zeros of FP16; in other words, all values of the second mantissa bit are set to 0.

In the step 611, the second exponent bit is set. In this interval, the operation unit 52 sets all values of the second exponent bit to 0.

When the value of the input data is identified as falling in the fifth interval [$2^{-149}$, $2^{-25}$) in the step 609, a representation range underflowing FP16 is determined, values of the range are zeros regardless of carry or not. In the step 610, the operation unit 52 directly converts the input data of FP32 data type to zeros of FP16 data type; in other words, all values of the second mantissa bit are set to 0. In the step 611, the operation unit 52 sets all values of the second exponent bit to 0.

This embodiment re-generates new random data and comparison data for comparison during the data type conversion. Because random data generated at random is different each time, a benchmark for judging whether to carry is different each time. When a piece of input data is recomputed hundreds of thousands or even hundreds of millions of times in a deep learning model, the random data generated at random is sometimes large and sometimes small, and from the point of view of a large number of data, this situation helps to control the precision of the data after the data type conversion within a certain range, and will not lead to a large number of unilateral operations (which are a large number of carry operations or rounding operations) to increase the error as the number of iterations increases.

When the aforementioned pieces of data are stored in the storage unit 53, these pieces of data are arranged in either the NRAM 531 or the WRAM 532 densely and continuously. In the case of FP32 and FP16, the data types are 32 bits and 16 bits respectively, each bit is valid data, and when the SRAM 408 sends a plurality of pieces of input data of FP32 or FP16 at a time, these pieces of data are continuously stored in the NRAM 531 or the WRAM 532. In the case of TF32, although the data type is 32 bits, only the high 19 bits are valid data, and the remaining 13 bits are useless data (whose values are 0 by default). This embodiment still allocates 32 bits of storage space, so that the TF32 data is also continuously arranged in either the NRAM 531 or the WRAM 532.

As previously described, when the first data type is FP32 and the second data type is TF32 or FP16, a length of random data is 13 bits, but 13 bits are not friendly for storage space management. In order to facilitate uniform hardware processing, storage space allocated to each piece of random data in this embodiment is 16 bits, which are 2 bytes, in which only the low 13 bits of data are valid, and the high 3 bits of data are useless data (whose values are 0 by default).

Since each piece of FP32 data occupies 4 bytes of storage space, each piece of random data occupies 2 bytes of storage space, and a data type conversion of a piece of FP32 data requires to be paired with a piece of random data, the amount of random data in the NRAM 531 or the WRAM 532 is half of the amount of input data of FP32 data type. In other words, storage space allocated to the random data by the storage unit 53 is half of storage space of the input data of the first data type. If FP32 is converted to TF32, the amount of output data is the same as that of input data; and if FP32 is converted to FP16, the amount of the output data is half of that of the input data. The storage unit 53 transmits data to the operation unit 52 through two paths, where a first path is used to transfer input data, and a second path is used to transfer random data. In the case of converting FP32 to FP16 or TF32, in each cycle, the amount of data transferred in the first path is twice of the amount of data transferred in the second path.

Figure 10:
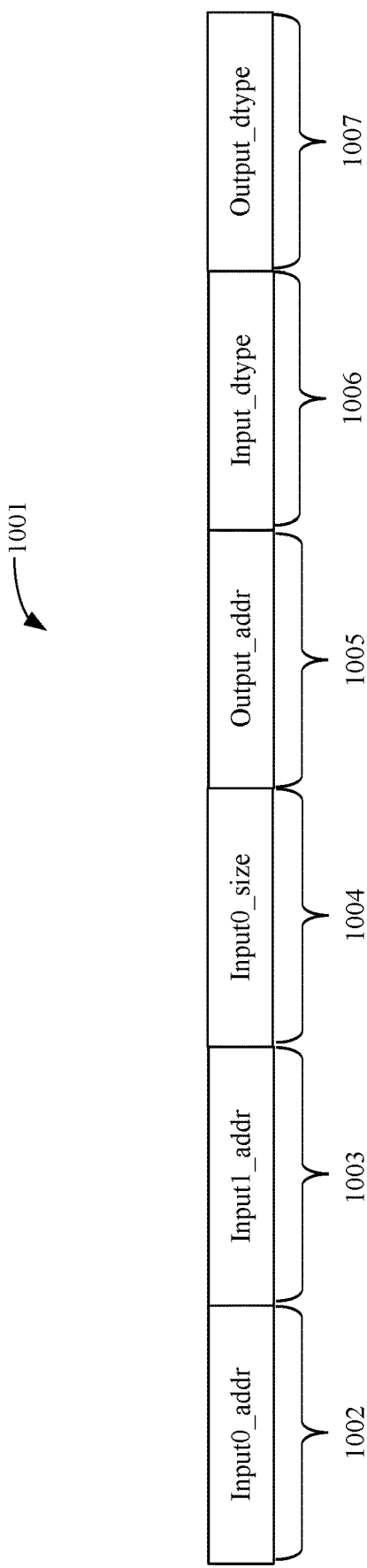
FIG. 10 is a schematic diagram of a stochastic rounding data type conversion instruction according to an embodiment of the present disclosure.

This embodiment implements the aforementioned data type conversion operation according to a stochastic rounding data type conversion instruction. FIG. 10 is a schematic diagram of a stochastic rounding data type conversion instruction according to an embodiment of the present disclosure. A stochastic rounding data type conversion instruction 1001 includes an input data address operation domain (Input0_addr) 1002 indicating a starting address of input data, a random data address operation domain (Input1_addr) 1003 indicating a starting address of corresponding random data, an input data size operation domain (Input0_size) 1004 indicating a size of input data, an output data address operation domain (Output_addr) 1005 indicating a starting address of data after a data type conversion, an input data type operation domain (Input_dtype) 1006 indicating a first data type, and an output data type operation domain (Output_dtype) 1007 indicating a second data type.

In the case of converting FP32 to FP16 or TF32, the instruction decode unit 512 decodes the acquired stochastic rounding data type conversion instruction, divides a decoding result into a plurality of microinstructions, and sends the plurality of microinstructions to the operation unit 52 and the storage unit 53 respectively. The storage unit 53 learns a size of input data that should be read according to the input data size operation domain 1004, fetches a piece of complete input data according to the address of the input data address operation domain 1002, and then reads random data whose size is half of the Input0_size according to the random data address operation domain 1003.

In detail, transmission bandwidths of the first path and the second path and a computing bandwidth of the operation unit 52 may be set to 128 bytes; in other words, the storage unit 53 transmits 128 bytes of input data to the operation unit 52 through the first path every cycle. Since each 128 bytes of input data consumes only 64 bytes of random data, the storage unit 53 transmits 64 bytes of random data to the operation unit 52 through the second path every cycle. Therefore, the operation unit 52 receives the matched input data and random data simultaneously to facilitate the data type conversion operation.

The operation unit 52 acquires information about the first data type according to the input data type operation domain 1006, and acquires information about the second data type according to the output data type operation domain 1007. Based on these two operation domains, the operation unit 52 learns data types before and after the data type conversion. If the second data type is TF32, the operation unit 52 generates and outputs 128 bytes of TF32 data per cycle. If the second data type is FP16, the operation unit 52 generates 64 bytes of FP16 data per cycle. In order to meet the bandwidth requirements as far as possible, the operation unit 52 outputs 128 bytes of FP16 data only once at an interval of one cycle; in other words, the operation unit 52 outputs 2 pieces of 64 bytes of FP16 data at an interval of one cycle. The operation unit 52 then, according to the address of the output data address operation domain 1005, stores the data after the data type conversion to storage space of a corresponding address of the storage unit 53.

This embodiment re-generates new random data and comparison data for comparison during the data type conversion. Because random data generated at random is different each time, a benchmark for judging whether to carry is different each time. When a piece of input data is recomputed hundreds of thousands or even hundreds of millions of times in a deep learning model, the random data generated at random is sometimes large and sometimes small, and from the point of view of a large number of data, this situation helps to control the precision of the data after the data type conversion within a certain range, and will not make the error greater with more times of computing.

Another embodiment of the present disclosure is a computer readable storage medium, on which computer program codes of a method for converting input data from a first data type to a second data type are stored. When the computer program codes are run by a processor, the method of the aforementioned embodiment is performed. In some implementation scenarios, the above integrated unit may be implemented in the form of a software program unit. If the integrated unit is implemented in the form of the software program unit and sold or used as an independent product, the integrated unit may be stored in a computer-readable memory. Based on this, when the scheme of the present disclosure is embodied in the form of a software product (such as a computer-readable storage medium), the software product may be stored in a memory. The software product may include several instructions used to enable a computer device (such as a personal computer, a server, or a network device, and the like) to perform part or all of steps of the method of the embodiments of the present disclosure. The memory includes, but is not limited to, an USB, a flash disk, a read only memory (ROM), a random access memory (RAM), a mobile hard disk, a magnetic disk, or an optical disc, and other media that may store a program code.

The present disclosure dynamically determines carry or rounding by generating comparison data and comparing the comparison data with random data. Because the random data is different every time, the precision of the same input data may be maintained in the process of a large number of repeated data type conversion iterations, so that the error will not become larger and larger with iterations.

According to different application scenarios, an electronic device or apparatus of the present disclosure may include a server, a cloud server, a server cluster, a data processing apparatus, a robot, a computer, a printer, a scanner, a tablet, a smart terminal, a PC device, an Internet of Things terminal, a mobile terminal, a mobile phone, a traffic recorder, a navigator, a sensor, a webcam, a camera, a video camera, a projector, a watch, a headphone, a mobile storage, a wearable device, a visual terminal, an autonomous driving terminal, a vehicle, a household appliance, and/or a medical device. The vehicle includes an airplane, a ship, and/or a car; the household appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograma electronic device or apparatus of the present disclosure may also be applied to Internet, Internet of Things, data center, energy, transportation, public management, manufacturing, education, power grid, telecommunications, finance, retail, construction sites, medical, and other fields. Further, the electronic device or apparatus of the present disclosure may also be used in application scenarios including cloud, edge, and terminal related to artificial intelligence, big data, and/or cloud computing. In one or a plurality of embodiments, according to the solution of the present disclosure, an electronic device or apparatus with high computing power may be applied to a cloud device (such as the cloud server), while an electronic device or apparatus with low power consumption may be applied to a terminal device and/or an edge device (such as a smart phone or the webcam). In one or a plurality of embodiments, hardware information of the cloud device is compatible with that of the terminal device and/or the edge device. As such, according to the hardware information of the terminal device and/or the edge device, appropriate hardware resources may be matched from hardware resources of the cloud device to simulate hardware resources of the terminal device and/or the edge device to complete unified management, scheduling, and collaborative work of terminal-cloud integration or cloud-edge-terminal integration.

It should be explained that for the sake of brevity, the present disclosure describes some method embodiments as a series of actions and combinations thereof, but those skilled in the art may understand that the solution of the present disclosure is not limited by the order of actions described. Therefore, according to the present disclosure or under the teaching of the present disclosure, those skilled in the art may understand that some steps of the method embodiments may be performed in a different order or simultaneously. Further, those skilled in the art may understand that the embodiments described in the present disclosure may be regarded as optional embodiments; in other words, actions and units involved thereof are not necessarily required for the implementation of a certain solution or some solutions of the present disclosure. Additionally, according to different solutions, descriptions of some embodiments of the present disclosure have their own emphases. In view of this, those skilled in the art may understand that, for a part that is not described in detail in a certain embodiment of the present disclosure, reference may be made to related descriptions in other embodiments.

For specific implementations, according to the present disclosure and under the teaching of the present disclosure, those skilled in the art may understand that several embodiments disclosed in the present disclosure may be implemented in other ways that are not disclosed in the present disclosure. For example, for units in the aforementioned electronic device or apparatus embodiment, the present disclosure divides the units on the basis of considering logical functions, but there may be other division methods during actual implementations. For another example, a plurality of units or components may be combined or integrated into another system, or some features or functions in the units or components may be selectively disabled. In terms of a connection between different units or components, the connection discussed above in combination with drawings may be direct or indirect coupling between the units or components. In some scenarios, the direct or indirect coupling relates to a communication connection using an interface, where the communication interface may support electrical, optical, acoustic, magnetic, or other forms of signal transmission.

In the present disclosure, units described as separate components may be or may not be physically separated. Components shown as units may be or may not be physical units. The components or units may be located in a same position or distributed to a plurality of network units. Additionally, according to actual requirements, some or all of the units may be selected to achieve the purpose of the solution described in the embodiments of the present disclosure. Additionally, in some scenarios, the plurality of units in the embodiments of the present disclosure may be integrated into one unit, or each of the units may be physically separated.

In some other implementation scenarios, the integrated unit may be implemented in the form of hardware. The hardware may be a specific hardware circuit, which may include a digital circuit and/or an analog circuit, and the like. A physical implementation of a hardware structure of the circuit includes but is not limited to a physical component. The physical component includes but is not limited to a transistor, or a memristor, and the like. In view of this, various apparatuses (such as the computing apparatus or other processing apparatus) described in the present disclosure may be implemented by an appropriate hardware processor, such as a central processing unit (CPU), a graphics processing unit (GPU), a field-programmable gate array (FPGA), a digital signal processor (DSP), and an application-specific integrated circuit (ASIC), and the like. Further, the storage unit or the storage apparatus may be any appropriate storage medium (including a magnetic storage medium or a magneto-optical storage medium, and the like), such as a resistive random access memory (RRAM), a dynamic random access memory (DRAM), a static random access memory (SRAM), an enhanced dynamic random access memory (EDRAM), a high bandwidth memory (HBM), a hybrid memory cube (HMC), a read only memory (ROM), and a random access memory (RAM), and the like.

The foregoing may be better understood according to following articles:

Article A1. A method for converting input data from a first data type to a second data type, where the first data type includes a first exponent bit and a first mantissa bit, the second data type includes a second exponent bit and a second mantissa bit, and the method includes: judging whether the number of bits of the first exponent bit is the same as the number of bits of the second exponent bit; performing following steps if the number of bits of the first exponent bit is the same as the number of bits of the second exponent bit: determining comparison data for the number of bit difference between the first mantissa bit and the second mantissa bit in the first mantissa bit; generating random data, where the number of bits of the random data is the number of bit difference; judging whether the comparison data is greater than the random data; and carrying the second mantissa bit if the comparison data is greater than the random data.

Article A2. The method of article A1, where if the number of bits of the first exponent bit is the same as the number of bits of the second exponent bit, the method further includes: setting a value of the second exponent bit to a value of the first exponent bit.

Article A3. The method of article A2, where in the carrying step, if values of all bits of the first mantissa bit corresponding to the second mantissa bit are all 1 before the carry, following steps are performed: setting all bits of the second mantissa bit to values after the carry; and adding one to the value of the second exponent bit.

Article A4. The method of article A1, where a normalized number of the first data type has a value range between $2^{first\ interval\ number}$ and $2^{first\ upper\ limit}$, a denormalized number of the first data type has a value range between $2^{first\ lower\ limit}$ and $2^{first\ interval\ number}$, a normalized number of the second data type has a value range between $2^{second\ interval\ number}$ and $2^{second\ upper\ limit}$, a denormalized number of the second data type has a value range between $2^{second\ lower\ limit}$ and $2^{second\ interval\ number}$, and if the number of bits of the first exponent bit is different from the number of bits of the second exponent bit, the method further includes: identifying a value interval of the input data; setting the second mantissa bit based on the value interval; and setting the second exponent bit based on the value interval.

Article A5. The method of article A4, where in the identifying step, when a value of the input data falls in [$2^{second\ upper\ limit}$, $2^{first\ upper\ limit}$), all values of the second mantissa bit are set to 0 in the step of setting the second mantissa bit.

Article A6. The method of article A5, where all values of the second exponent bit are set to 1 in the step of setting the second exponent bit.

Article A7. The method of article A4, where in the identifying step, when a value of the input data falls in [$2^{second\ interval\ number}$, $2^{second\ upper\ limit}$), the step of setting the second mantissa bit includes: determining the comparison data for the number of bit difference between the first mantissa bit and the second mantissa bit; setting the second mantissa bit as continuous data truncated from highest-bit data to low-bit data in the first mantissa bit, where the number of bits truncated is equal to the number of bits of the second mantissa bit; generating the random data, where the number of bits of the random data is the number of bit difference; judging whether the comparison data is greater than the random data; and carrying the second mantissa bit if the comparison data is greater than the random data.

Article A8. The method of article A7, where a value of the second exponent bit=a value of the first exponent bit−the first upper limit+the second upper limit in the step of setting the second exponent bit.

Article A9. The method of article A4, where in the identifying step, when a value of the input data falls in [$2^{second\ lower\ limit}$, $2^{second\ interval\ number}$), the step of setting the second mantissa bit includes: determining the comparison data for the number of bit difference between the first mantissa bit and the second mantissa bit; setting values of a specific number of bits of the second mantissa bit from the highest bit as 0; setting a value of a (specific number+1)-th bit of the second mantissa bit from the highest bit as 1; and setting values of (specific number−1) bits of the second mantissa bit from a (specific number+2)-th bit as values of (specific number−1) bits of the first mantissa bit from the highest bit.

Article A10. The method of article A9, where the comparison data is bits with the number of continuous bit difference from a starting bit in the first mantissa bit, where the starting bit is the number of bits of the second mantissa bit−(the second interval number−a value of the first exponent bit+1) from the highest bit.

Article A11. The method of article A10, where the specific number is the starting bit.

Article A12. The method of article A4, where in the identifying step, when a value of the input data falls in [$2^{second\ lower\ limit−1}$, $2^{second\ lower\ limit}$), the step of setting the second mantissa bit includes: determining the comparison data for the number of bit difference between the first mantissa bit and the second mantissa bit; generating the random data, where the number of bits of the random data is the number of bit difference; judging whether the comparison data is greater than the random data; and setting the second mantissa bit to a minimum value if the comparison data is greater than the random data.

Article A13. The method of article A12, where the step of determining the comparison data includes: setting a value of the highest bit of the comparison data to 1; and setting values of other bits of the comparison data to values of first bits with the number of bit difference minus one in the first mantissa bit.

Article A14. The method of article A12, where all values of the second mantissa bit are set to 0 if the comparison data is not greater than the random data.

Article A15. The method of article A4, where in the identifying step, when a value of the input data falls in [$2^{first\ lower\ limit}$, $2^{second\ lower\ limit−1}$], the step of setting the second mantissa bit includes: setting all values of the second mantissa bit to 0.

Article A16. The method of article A9, A12 or A15, where all values of the second exponent bit are set to 0 in the step of setting the second exponent bit.

Article A17. The method of article A1, where the generating step includes: randomly generating a value of each bit in the random data.

Article A18. The method of article A1, where the first data type is FP32, and the second data type is one of TF32 and FP16.

Article A19. A computer readable storage medium, on which computer program codes for converting input data from a first data type to a second data type are stored, where when the computer program codes are run by a processing apparatus, the method of any one of articles A1 to A18 is performed.

Article A20. A computing apparatus, where the computing apparatus converts input data from a first data type to a second data type, where the first data type includes a first exponent bit and a first mantissa bit, the second data type includes a second exponent bit and a second mantissa bit, and the computing apparatus includes: a control unit configured to send a plurality of instructions; a storage unit configured to temporarily store the input data and random data and send the input data and the random data according to at least one of the plurality of instructions, where the number of bits of the random data is the number of bit difference; and an operation unit, according to at least one of the plurality of instructions, configured to: judge whether the number of bits of the first exponent bit is the same as the number of bits of the second exponent bit; determine comparison data for the number of bit difference between the first mantissa bit and the second mantissa bit in the first mantissa bit if the number of bits of the first exponent bit is the same as the number of bits of the second exponent bit; judge whether the comparison data is greater than the random data; and carry the second mantissa bit if the comparison data is greater than the random data.

Article A21. The computing apparatus of article A20, further including a memory core configured to generate the random data.

Article A22. The computing apparatus of article A21, where the memory core randomly generates a value of each bit in the random data.

Article A23. The computing apparatus of article A20, where storage space allocated to the random data by the storage unit is half of storage space of input data of the first data type.

Article A24. The computing apparatus of article A20, where the instructions include: an input data address operation domain configured to indicate a starting address of the input data; a random data address operation domain configured to indicate a starting address of the random data; and an input data size operation domain configured to indicate a size of the input data, where the storage unit learns the size of the input data according to the input data size operation domain, fetches the complete input data according to the input data address operation domain, and then reads the random data according to the random data address operation domain.

Article A25. The computing apparatus of article A20, where the instructions include: an output data address operation domain configured to indicate a starting address of data after a data type conversion; an input data type operation domain configured to indicate the first data type; and an output data type operation domain configured to indicate the second data type, where the operation unit acquires information about the first data type according to the input data type operation domain, acquires information about the second data type according to the output data type operation domain, and stores the data after the data type conversion to storage space of a corresponding address of the storage unit according to the output data address operation domain.

Article A26. An integrated circuit apparatus, including the computing apparatus of any one of articles A20 to A25.

Article A27. A board card, including the integrated circuit apparatus of article A26.

The embodiments of the present disclosure have been described in detail above. The present disclosure uses specific examples to explain principles and implementations of the present disclosure. The descriptions of the above embodiments are only used to facilitate understanding of the method and core ideas of the present disclosure. Simultaneously, those skilled in the art may change the specific implementations and application scope of the present disclosure based on the ideas of the present disclosure. In summary, the content of this specification should not be construed as a limitation on the present disclosure.

What is claimed:

1. A method for converting first input data from a first data type to a second data type to generate second input data, during training of a machine learning model, wherein the first data type comprises a first exponent bit and a first mantissa bit, the second data type comprises a second exponent bit and a second mantissa bit, and the method comprises: determining whether a number of bits of the first exponent bit is the same as a number of bits of the second exponent bit, wherein a normalized number of the first data type has a value range between 2 second interval number and first upper limit a denormalized number of the first data type has a value range between 2 second lower limit and 2 second first interval number, a normalized number of the second data type has a value range between 2 second interval number and 2 second upper limit, and a denormalized number of the second data type has a value range between 2 second lower limit and 2 second interval number, performing following steps, for the generating of the second input data, if the number of bits of the first exponent bit is the same as the number of bits of the second exponent bit: determining comparison data for a number of bit difference between the first mantissa bit and the second mantissa bit in the first mantissa bit; generating random data, wherein a number of bits of the random data is the number of bit difference; determining whether the comparison data is greater than the random data; and carrying the second mantissa bit if the comparison data is greater than the random data; performing following steps, for the generating of the second input data, if the number of bits of the first exponent bit is different from the number of bits of the second exponent bit: identifying a value interval of the first input data; setting the second mantissa bit based on the value interval; and setting the second exponent bit based on the value interval; and performing, using the second input data, one or more operations of the training of the machine learning model, wherein data type precision of the second data type is lower than data type precision of the first data type.

2. The method of claim 1, wherein if the number of bits of the first exponent bit is the same as the number of bits of the second exponent bit, the method further comprises: setting a value of the second exponent bit to a value of the first exponent bit.

3. The method of claim 2, wherein in the carrying step, if values of all bits of the first mantissa bit corresponding to the second mantissa bit are all 1 before the carrying, following steps are performed: setting all bits of the second mantissa bit to values after the carrying; and adding one to the value of the second exponent bit.

4. The method of claim 1, wherein in the identifying step, when a value of the first input data falls in [2 second upper limit first upper limit), all values of the second mantissa bit are set to 0 in the step of setting the second mantissa bit.

5. The method of claim 4, wherein all values of the second exponent bit are set to 1 in the step of setting the second exponent bit.

6. The method of claim 1, wherein in the identifying step, when a value of the first input data falls in [2 second interval number, second upper limit), the step of setting the second mantissa bit further comprises:

determining the comparison data for the number of bit difference between the first mantissa bit and the second mantissa bit;

setting the second mantissa bit as continuous data truncated from highest-bit data to low-bit data in the first mantissa bit, wherein a number of bits truncated is equal to a number of bits of the second mantissa bit;

generating the random data, wherein the number of bits of the random data is the number of bit difference;

determining whether the comparison data is greater than the random data; and carrying the second mantissa bit if the comparison data is greater than the random data.

7. The method of claim 6, wherein a value of the second exponent bit=a value of the first exponent bit−the first upper limit+the second upper limit in the step of setting the second exponent bit.

8. The method of claim 1, wherein in the identifying step, when a value of the first input data falls in [2 second lower limit, 2 second interval number), the step of setting the second mantissa bit further comprises:

determining the comparison data for the number of bit difference between the first mantissa bit and the second mantissa bit;

setting values of a specific number of bits of the second mantissa bit from a highest bit as 0;

setting a value of a (specific number+1)-th bit of the second mantissa bit from the highest bit as 1; and setting values of (specific number−1) bits of the second mantissa bit from a (specific number+2)-th bit as values of (specific number−1) bits of the first mantissa bit from the highest bit.

9. The method of claim 8, wherein the comparison data is bits with a number of continuous bit difference from a starting bit in the first mantissa bit, wherein the starting bit is a number of bits of the second mantissa bit (the second interval number−a value of the first exponent bit+1) from the highest bit.

10. The method of claim 9, wherein the specific number is the starting bit.

11. The method of claim 1, wherein in the identifying step, when a value of the first input data falls in [2 second lower limit−1, 2 second lower limit), the step of setting the second mantissa bit further comprises:

determining the comparison data for the number of bit difference between the first mantissa bit and the second mantissa bit;

generating the random data, wherein the number of bits of the random data is the number of bit difference;

determining whether the comparison data is greater than the random data; and setting the second mantissa bit to a minimum value if the comparison data is greater than the random data.

12. The method of claim 11, wherein the step of determining the comparison data further comprises:

setting a value of a highest bit of the comparison data to 1; and setting values of other bits, different from the highest bit, of the comparison data to values of first bits with the number of bit difference minus one in the first mantissa bit.

* * * * *